United States Patent [19]

Eichelberger et al.

[11] 4,438,291
[45] Mar. 20, 1984

[54] SCREEN-PRINTABLE THERMOCOUPLES

[75] Inventors: Charles W. Eichelberger, Schenectady; Robert J. Wojnarowski, Ballston Lake; Abraham Auerbach, Albany, all of N.Y.

[73] Assignee: General Electric Company, Schenectady, N.Y.

[21] Appl. No.: 355,966

[22] Filed: Mar. 8, 1982

[51] Int. Cl.³ .............................................. H01J 35/12
[52] U.S. Cl. .................................... 136/236 R; 29/573; 106/20; 136/201; 136/212; 136/225; 428/901
[58] Field of Search ............................ 29/573; 106/20; 136/201, 205, 212, 225, 236; 428/401; 338/309

[56] References Cited

U.S. PATENT DOCUMENTS

| | | | |
|---|---|---|---|
| 3,071,495 | 1/1963 | Hänlein | 136/201 X |
| 4,049,844 | 9/1977 | Bolon et al. | 428/901 X |
| 4,276,441 | 6/1981 | Wilson | 136/225 X |
| 4,356,366 | 10/1982 | Harper et al. | 106/20 X |

Primary Examiner—Leland A. Sebastian
Attorney, Agent, or Firm—Geoffrey H. Krauss; James C. Davis, Jr.; Marvin Snyder

[57] ABSTRACT

A low-cost thermocouple utilizes a substrate of a first conductor, upon a surface of which is deposited on insulative layer, supporting a screen-printed conductive ink pattern. A second conductor is electrolessly plated upon the conductive ink pattern and onto at least a portion of the first conductor, through an aperture in the insulation layer therebetween. Thermocouple action occurs along the length of the plated conductor contact with the substrate conductor.

20 Claims, 2 Drawing Figures

SCREEN-PRINTABLE THERMOCOUPLES

BACKGROUND OF THE INVENTION

The present invention relates to thermocouples and, more particularly, to a novel low-cost screen-printable thermocouple utilizing an augmentative replacement process in the fabrication thereof.

It is well known to manufacture thermocouples by welding the ends of two wires of dissimilar conductors, e.g. metals and the like. This welding method of manufacture is relatively costly, and is not easily amenable to mass production. Typically, because the welded wire junction is of small dimensions, the junction is placed in some form of housing, further complicating efficient heat transfer to the junction from the medium for which the temperature is to be measured. Further, the use of the housing severely limits the response of the thermocouple to rapid changes of temperature, with respect to time. It is highly desirable, for certain uses (such as providing disposable body thermometers and the like) to provide an easily mass-produced, low-cost thermometer having a rapid temperature response and a high degree of reproducibility.

BRIEF SUMMARY OF THE INVENTION

In accordance with the invention, a thermocouple is provided by depositing a layer of insulation over at least a portion of a surface of a substrate of a first conductor; a second conductor is fabricated at least partially upon the insulator film and partially on the substrate surface, using the augmentative replacement process disclosed and claimed in application Ser. No. 220,342, filed Dec. 29, 1980, now U.S. Pat. No. 4,404,237 assigned to the assignee of the present application and incorporated herein by reference in its entirety. A base of a powdered metal-ink composition is screen printed to extend over a portion of the insulative layer and over a portion of the first conductor substrate surface; the thermocouple second conductor is electrolessly plated upon the surface of the ink composition, with the second conductor being of a metal having a cation more noble than the metal of the powder. The second conductor contacts the first conductor substrate surface along a boundary of the screened ink composition deposit, at which boundary thermocouple action occurs.

In presently preferred embodiments of our novel thermocouples, the ink composition utilizes a polymer vehicle, such as an epoxy, polyester or polyimide, containing a powdered metal mixture. The powdered metal mixtures may include: a mixture of 30% zinc powder and 70% nickel powder; a mixture of 50–70% nickel powder to 30–50% iron powder, and the like. The electrolessly plated second conductor may be copper, with the substrate first conductor material being selected to be of nickel, steel, constantan and the like.

Accordingly, it is an object of the present invention to provide a novel screen-printable thermocouple.

It is another object of the present invention to provide a novel method for fabricating a screen-printable thermocouple.

These and other objects of the present invention will become apparent upon consideration of the following detailed description, when read in conjunction with the drawings.

DETAILED DESCRIPTION OF THE PREFERRED EMBODIMENTS

Figure 1:
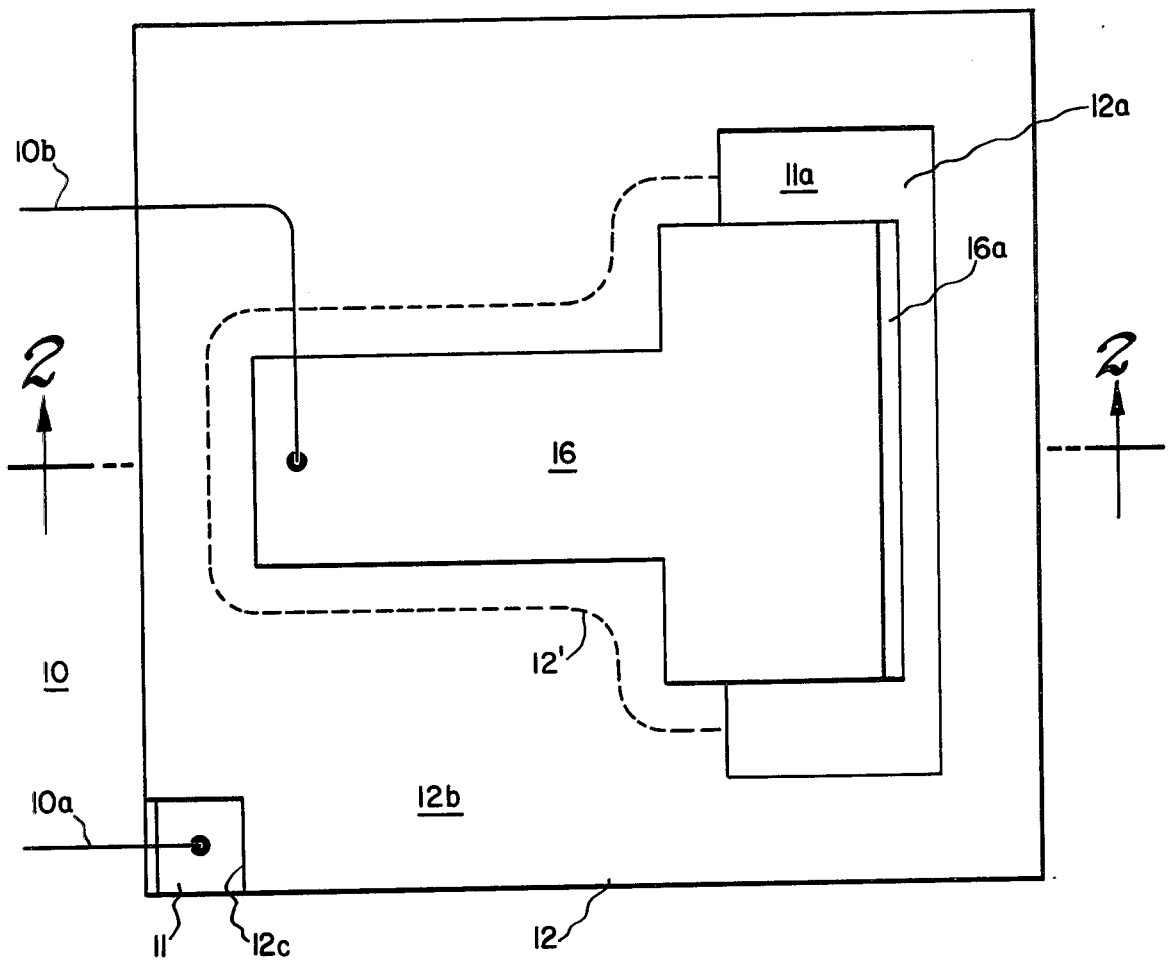
FIG. 1 is a plan view of one embodiment of a screen-printable thermocouple in accordance with the principles of the present invention.
Figure 2:
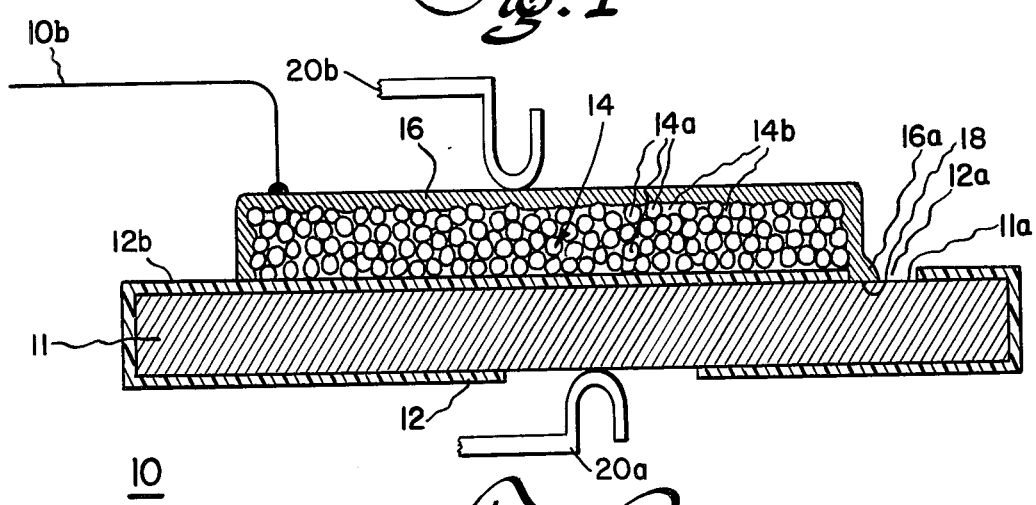
FIG. 2 is a sectional side view of the screen-printable thermocouple of FIG. 1, taken along lines 2—2.

Referring to the Figures, a screen-printable thermocouple 10 includes a substrate 11 of a first conductive material. Substrate 11 may be fabricated of a metal, such as nickel, steel, constantan and the like, having a desired shape for the desired end use. A layer 12 of an insulating material is fabricated upon at least one surface 11a of the substrate. Insulative layer 12 may cover one or both opposed substrate sides, and may cover one or more ends of the substrate, as desired. However, at least one aperture 12a is provided through insulative layer 12 to the substrate surface 11a. A quantity of a conductive ink composition 14 is deposited, as by screen printing and the like processes, upon a portion of the insulative layer surface 12b adjacent to insulative layer aperture 12a, and also through at least a portion of aperture 12a onto the first conductor substrate surface 11a. The conductive ink composition, or metallized polymer, 14 may be any one of the ink compositions disclosed in the aforementioned application Ser. No. 220,342, and has a quantity of metal power 14a dispersed in a polymeric vehicle ink, 14b. The polymer vehicle, may be an epoxy, polyester or polyimide, for thermocouples utilized to measure temperatures up to about 300° C. The metallic powder 14a may include blends such as (a) 70%, by weight, of powdered nickel and 30%, by weight, of powdered zinc, (b) 50–70%, by weight, of powdered nickel and 50–30%, by weight, of powdered iron, and the like. The metallized polymer ink composition 14 is prepared by dispersing the metal powder 14a into the polymeric ink vehicle 14b, with at least 75%, by weight, of the resulting composition being comprised of the powdered metal 14a.

After deposition, by screen printing and the like, of ink composition 14 upon at least a portion of substrate surface 11a, ink composition 14 may be cured, if the polymer vehicle requires such curing, and with a curing cycle dependent upon the ink composition utilized. By way of example, with an ink composition utilizing one of the NOVALAC® epoxies (available from Dow Chemical Co.) as vehicle 14b, curing is carried out by exposure of the substrate-insulation layer-ink composition article at 100° C. for 30 minutes and thence at 160° C. for one hour. When a polyimide is used as the ink vehicle, curing is carried out at 200° C. for 30 minutes, followed by a 10 minute period at 250° C. and another 10 minute period at 300° C.

After curing of ink composition 14, if required, the substrate-insulated layer-ink composition article is immersed in a copper plating bath, as described in the aforementioned application Ser. No. 220,342, to provide an electroless plating 16 of a second conductor material, e.g. copper, about the exterior of ink composition deposit 14. The plated second conductor 16 thus covers the exterior surface of composition 14 and includes a boundary portion 16a plated onto the first conductor substrate surface 11a. Thermocouple action occurs at the boundary 18 between first conductor substrate 11 and second conductor portion 16a.

Suitable lead arrangements 10a and 10b connect respectively to the first conductor substrate, as through a second aperture 12c in the insulative layer, and to the second conductor coating 16. Advantageously, lead 10a is fabricated of the same first conductor material as is used to fabricate substrate 11, and lead 10b is fabricated of the same second conductor material as forms plating 16, to prevent formation of additional thermocouples in series with the desired thermocouple (formed at the interface of plating portion 16a and substrate 11.)

As thermocouple action occurs only at the contact of plating portion 16a to substrate 11, the response time of the thermocouple 10 may be tailored by tailoring the extent of that interface. While a "T-tab" shape is shown for plated conductor 16, other shapes may be utilized as desired. Similarly, the insulation layer 12 may be provided only upon that surface of substrate 11 which is to be contraced by second conductor portion 16a, and the insulative layer may be provided, as shown by broken-line layer 12' in FIG. 1, only under that portion of the substrate surface which will bear ink composition 14 and plating 16. Because the fabrication of our novel thermocouple 10 can be carried out with only a single screen-printed deposit of a single ink composition (which single deposit may be of relatively small dimensions), the printing screen may be so designed as to deposit an array of ink composition formations, spaced each from the other, whereby the final processing of a large substrate can provide an array of a multiplicity of thermocouples. The thermocouples may be interconnected, if required, or the thermocouples may be separated from one another by appropriate strate cutting techniques. Further, for the particular use of providing disposable body thermometers and the like using thermocouple 10 as the temperature sensor, a pair of opposed spring contacts 20a and 20b can be provided to contact opposed surfaces of the thermocouple. Thus, lower spring contact 20a is positioned to contact substrate 11 and is fabricated of the same material, e.g. nickel, as the material utilized for substrate 11. Second spring finger 20b is positioned to contact second conductor plating 16, and is fabricated of the same conductor, e.g. copper, as the plating conductor material. In this manner, a new thermocouple element 10 may be slid in between the spring fingers 20 of an associated electronic thermometer and the like (not shown) utilized to determine a temperature, and the thermocouple 10 thence removed from between spring fingers 20 and disposed of after use, as may be required for proper hygienic technique and the like. It will also be understood that a wide choice of first and second conductor combinations is available. For example, if substrate 11 is fabricated of nickel, with plating 16 being fabricated of copper, a thermoelectric output of about 10 microvolts per degree Fahrenheit is obtained. A greater thermoelectric output, of about 20 microvolts per degree Fahrenheit, is obtained with constantan as the metal utilized in substrate 11, with a copper plating 16 as the second conductor.

While several presently preferred embodiments have been described in detail herein, many modifications and variations will now become apparent to those skilled in the art. It is our intent, therefore, to be limited only by the scope of the appending claims and not by the specific details and instrumentalities presented by way of explanation herein.

What is claimed is:

1. A thermocouple comprising:

a substrate of a first conductor, said substrate having a surface;

a layer of insulation fabricated upon at least a portion of said substrate surface, said insulative layer having a surface opposite said substrate;

an ink composition design fabricated upon at least a portion of said insulative layer surface, said ink composition including a polymer having at least 75% by weight of a powdered metal dispersed therein; and a second conductor, of a material different from said first conductor and from the powdered metal of said ink composition, plated onto at least a portion of each of said ink composition design and also onto said substrate surface, and forming a single thermocouple junction by contact or said second conductor with said substrate conductor.

2. The thermocouple of claim 1, wherein said first conductor is selected from the group consisting of nickel, steel and constantan.

3. The thermocouple of claim 1, wherein said second conductor is copper.

4. The thermocouple of claim 1, wherein said polymer is one of an epoxy, a polyester and a polyimide.

5. The thermocouple of claim 4, wherein the powdered metal is a mixture of about 30%, by weight, of powdered zinc and about 70%, by weight, of powdered nickel.

6. The thermocouple of claim 4, wherein the powdered metal is a mixture of about 50% to about 70%, by weight, of powdered nickel and about 50% to about 30%, by weight, of powdered iron.

7. The thermocouple of claim 1, wherein said second conductor is formed upon substantially the entire exterior surface of said ink composition design.

8. The thermocouple of claim 1, further comprising means for forming electrical connections to individual ones of said first and second conductors.

9. The thermocouple of claim 8, wherein said connection-forming means includes first and second lead means respectively for forming electrical connections to said first and second conductors, each of said first lead means and conductor being of the same conductive material and each of said second lead means and conductor being of the same conductive material.

10. The thermocouple of claim 1, wherein said insulation layer has an aperture formed therethrough; and at least said second conductor extends through said aperture to contact said substrate surface.

11. A method for fabricating a thermocouple, comprising the steps of:

providing a substrate of a first conductor, the substrate having a surface;

fabricating a layer of an insulative material over at least a portion of the substrate surface and having an insulative layer surface opposite said substrate;

applying a desired design of an ink composition, including a polymer and a powdered metal, to at least a portion of the insulative layer surface; and plating a second conductor, of a material different from said first conductor and from the powdered metal of said ink composition, on at least a portion of said ink composition and also on and in contact with the substrate surface, to form a single thermocouple junction by contact of said second conductor with the substrate conductor.

12. The method of claim 11, further comprising the steps of: providing an aperture through said insulative layer; and fabricating the second conductor to contact the substrate surface through the aperture.

13. The method of claim 11, wherein the ink composition is deposited by screen-printing.

14. The method of claim 11, wherein the first conductor is selected from the group consisting of nickel, steel and constantan.

15. The method of claim 11, wherein the second conductor is copper.

16. The method of claim 11, wherein said design applying step includes the steps of: selecting a polymer from the group consisting of epoxies, polyesters and polyimides; and dispersing powdered metal into the polymer in an amount equal to at least 75%, by weight, of the ink composition prior to application.

17. The method of claim 16, wherein the powdered metal is a mixture of about 30%, by weight, of powdered zinc and about 70%, by weight, of powdered nickel.

18. The method of claim 16, wherein the powdered metal is a mixture of about 50% to about 70%, by weight, of powdered nickel and about 50% to about 30%, by weight, of powdered iron.

19. The method of claim 11, further comprising the step of forming electrical connections with first and second leads to each associated one of the first and second conductors.

20. The method of claim 19, wherein the first and second leads are respectively formed of the same material as the associated one of the first and second conductors.

* * * * *